(12) United States Patent
Namadevan et al.

(10) Patent No.: US 11,293,375 B2
(45) Date of Patent: Apr. 5, 2022

(54) VARIABLE AREA EJECTOR

(71) Applicant: General Electric Company, Schenectady, NY (US)

(72) Inventors: Arvind Namadevan, Bangalore (IN); Hari Shanker Thakur, Bangalore (IN); Jeffrey Douglas Rambo, Mason, OH (US); Arnab Sen, Bangalore (IN); Siddhartha Pal, Gurgaon (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/788,384

(22) Filed: Feb. 12, 2020

(65) Prior Publication Data
US 2021/0246849 A1    Aug. 12, 2021

(51) Int. Cl.
| *F02C 6/08* | (2006.01) |
| *F02K 1/18* | (2006.01) |
| *F02K 1/36* | (2006.01) |
| *F04F 5/46* | (2006.01) |

(52) U.S. Cl.
CPC .............. *F02K 1/18* (2013.01); *F02C 6/08* (2013.01); *F02K 1/36* (2013.01); *F04F 5/461* (2013.01)

(58) Field of Classification Search
CPC ...... F02C 6/08; F02K 1/36; F02K 1/08; F04F 3/00; F04F 5/461
See application file for complete search history.

(56) References Cited

U.S. PATENT DOCUMENTS

| 3,048,973 A | * | 8/1962 | Benedict | .................. F02K 1/36 |
| | | | | 239/127.3 |
| 3,441,045 A | | 4/1969 | Malone | |
| 3,552,883 A | | 1/1971 | Weatherbee | |
| 4,182,117 A | | 1/1980 | Exley et al. | |
| 4,263,786 A | | 4/1981 | Eng | |
| 4,367,626 A | | 1/1983 | Schwartzman | |
| 4,516,660 A | * | 5/1985 | Greenlaw | ................. F02K 1/46 |
| | | | | 181/215 |

(Continued)

FOREIGN PATENT DOCUMENTS

| EP | 3287370 B1 | 11/2019 |
| GB | 1762649 | 10/1953 |

*Primary Examiner* — Gerald L Sung
(74) *Attorney, Agent, or Firm* — Dority & Manning, P.A.

(57) ABSTRACT

An ejector assembly includes a primary nozzle in fluid communication with a primary fluid inlet, a secondary nozzle in fluid communication with a secondary fluid inlet, the primary nozzle being oriented concentrically within the secondary nozzle and the secondary nozzle having a venturi downstream of the primary nozzle, and the primary nozzle having a variable cross-sectional area. A gas turbine engine includes a source of high pressure air, a region of low pressure air, and an ejector assembly, the ejector assembly includes a primary nozzle in fluid communication with a primary fluid inlet, the primary fluid inlet in fluid communication with the source of high pressure air, a secondary nozzle in fluid communication with a secondary fluid inlet, the secondary fluid inlet in fluid communication with the region of low pressure air, the primary nozzle being oriented concentrically within the secondary nozzle and the secondary nozzle having a venturi downstream of the primary nozzle, and the primary nozzle having a variable cross-sectional area.

16 Claims, 10 Drawing Sheets

(56) References Cited

U.S. PATENT DOCUMENTS

| | | | |
|---|---|---|---|
| 4,926,633 A | 5/1990 | Nash et al. | |
| 5,575,244 A * | 11/1996 | Dethier | F22B 1/1815 |
| | | | 122/406.1 |
| 5,993,149 A | 11/1999 | Smed | |
| 6,164,059 A | 12/2000 | Liang et al. | |
| 6,701,715 B2 | 3/2004 | Anderson et al. | |
| 7,025,565 B2 | 4/2006 | Urso et al. | |
| 7,175,692 B2 | 2/2007 | Schwalm | |
| 7,527,481 B2 | 5/2009 | Baryshnikov et al. | |
| 8,733,110 B2 | 5/2014 | Weber et al. | |
| 2002/0022172 A1* | 2/2002 | Sahoda | F04F 5/48 |
| | | | 429/512 |
| 2002/0106547 A1* | 8/2002 | Sugawara | F04F 5/461 |
| | | | 429/443 |
| 2003/0097872 A1* | 5/2003 | Granitz | F01D 25/20 |
| | | | 73/112.01 |
| 2003/0118455 A1* | 6/2003 | Vilela | F04F 5/461 |
| | | | 417/189 |
| 2008/0115503 A1 | 5/2008 | Vasquez et al. | |
| 2008/0118371 A1 | 5/2008 | Vasquez et al. | |
| 2015/0300377 A1 | 10/2015 | Tell | |
| 2018/0045074 A1 | 2/2018 | Sinha et al. | |

* cited by examiner

VARIABLE AREA EJECTOR

BACKGROUND OF THE INVENTION

The present invention pertains to ejectors, and more particularly to those with a variable primary nozzle area.

Ejectors are commonly used in systems where a flow of a primary fluid, such as a liquid or gas, is utilized to move a secondary fluid, such as a liquid or gas, by converting pressure energy into velocity. The two fluid streams are combined internally within the ejector and exit the ejector as a combined exit flow. Ejectors may be found in many different technology areas, and used in many different systems, including gas turbine engine systems where they may be utilized to pressurize or vent sump systems and manage bleed air flows. Ejectors as also sometimes referred to as "jet pumps" or "eductors".

Current ejectors typically have fixed primary and secondary nozzle areas, which offer limited ability to respond to various flow conditions and/or to vary the proportions of the two fluid streams in the resulting combined exit flow. With gas turbine engines, in particular, this limited ability to respond to various flow conditions throughout the operating envelope of the gas turbine engine may lead to less than optimal conditions. While valves on the primary flow leg have been used in some examples to provide a means of response, such valves are located outside of the ejector and require a control system to control the valve position.

It would therefore be desirable to modulate the flow rate of an ejector with a device of simplified construction which is reliable and durable in operational service and capable of responding to varied flow conditions.

BRIEF DESCRIPTION OF THE INVENTION

In one aspect, an ejector assembly includes a primary nozzle in fluid communication with a primary fluid inlet, a secondary nozzle in fluid communication with a secondary fluid inlet, the primary nozzle being oriented concentrically within the secondary nozzle and the secondary nozzle having a venturi downstream of the primary nozzle, and the primary nozzle having a variable cross-sectional area.

In another aspect, a gas turbine engine includes a source of high pressure air, a region of low pressure air, and an ejector assembly, the ejector assembly includes a primary nozzle in fluid communication with a primary fluid inlet, the primary fluid inlet in fluid communication with the source of high pressure air, a secondary nozzle in fluid communication with a secondary fluid inlet, the secondary fluid inlet in fluid communication with the region of low pressure air, the primary nozzle being oriented concentrically within the secondary nozzle and the secondary nozzle having a venturi downstream of the primary nozzle, and the primary nozzle having a variable cross-sectional area.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figures, in which.

Corresponding reference characters indicate corresponding parts throughout the several views. The exemplifications set out herein illustrate exemplary embodiments of the disclosure, and such exemplifications are not to be construed as limiting the scope of the disclosure in any manner.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present invention, and do not create limitations, particularly as to the position, orientation, or use of the invention. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Various aspects of the invention are explained more fully with reference to the exemplary embodiments discussed below. It should be understood that, in general, the features of one embodiment also may be used in combination with features of another embodiment, and that the embodiments are not intended to limit the scope of the invention.

Figure 1:
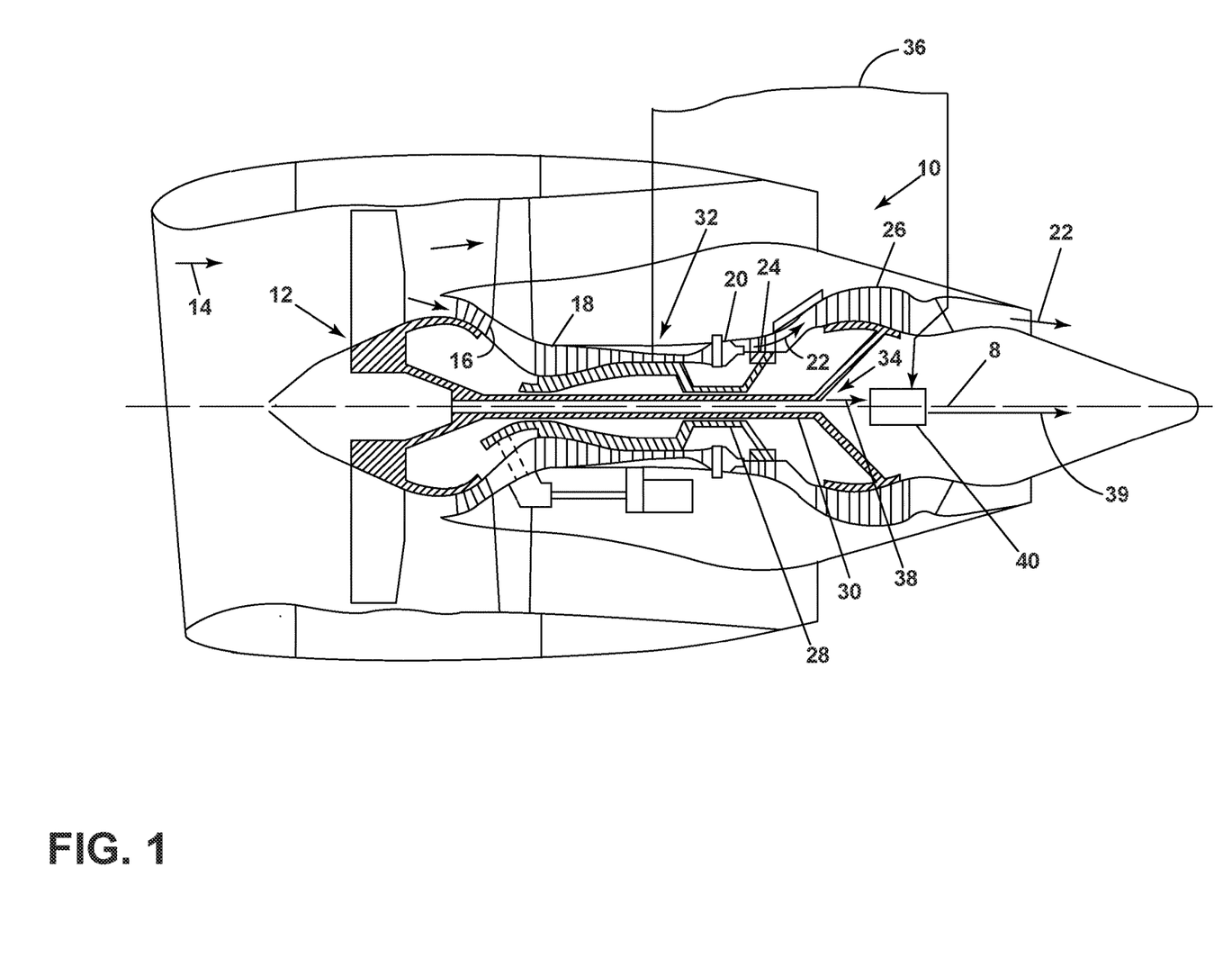
FIG. 1 is a cross-sectional schematic illustration of an exemplary turbofan gas turbine engine employing an ejector as described herein.

FIG. 1 is a cross-sectional schematic illustration of FIG. 1 is an exemplary turbofan gas turbine engine 10 circumscribed about a centerline axis 8. The engine 10 includes, in downstream flow relationship, a fan 12 which receives ambient air 14, a low pressure or booster compressor (LPC) 16, a high pressure compressor (HPC) 18, a combustor 20 which mixes fuel with the air 14 pressurized by the HPC 18 for generating combustion gases 22 which flow downstream through a high pressure turbine (HPT) 24, and a low pressure turbine (LPT) 26 from which the combustion gases 22 are discharged from the engine 10. A first or high pressure (HP) shaft 28 joins the HPT 24 to the HPC 18, and a second or low pressure (LP) shaft 30 joins the LPT 26 to both the fan 12 and the low pressure compressor 16.

A gas turbine engine 10 has a source of high pressure air 32, which may be a bleed from a stage of the high pressure compressor 18. Gas turbine engine 10 also has a region of low pressure air 34, which may be a sump. While the gas turbine engine 10 has sources and regions of high pressure air and sources and regions of low pressure air, in some operating conditions it is desirable to purge air from low pressure regions using high pressure air from a high pressure source. An ejector 40 may be utilized in such a configuration to harness the energy of the high pressure air 36 from the high pressure source 32 to purge low pressure air 38 from the low pressure region 34 through a vent 42 and provide a simple mechanical solution. Purging the low pressure region may alleviate a buildup of heat or suspended particles or fluids, and may maintain a positive flow of air through seals between different zones or compartments of the gas turbine engine 10. Ejector systems may also be utilized to pressurize or evacuate various locations within the gas turbine engine, manage airflow, and balance thrust in both airborne and stationary ground-based engine installations.

Figure 2:
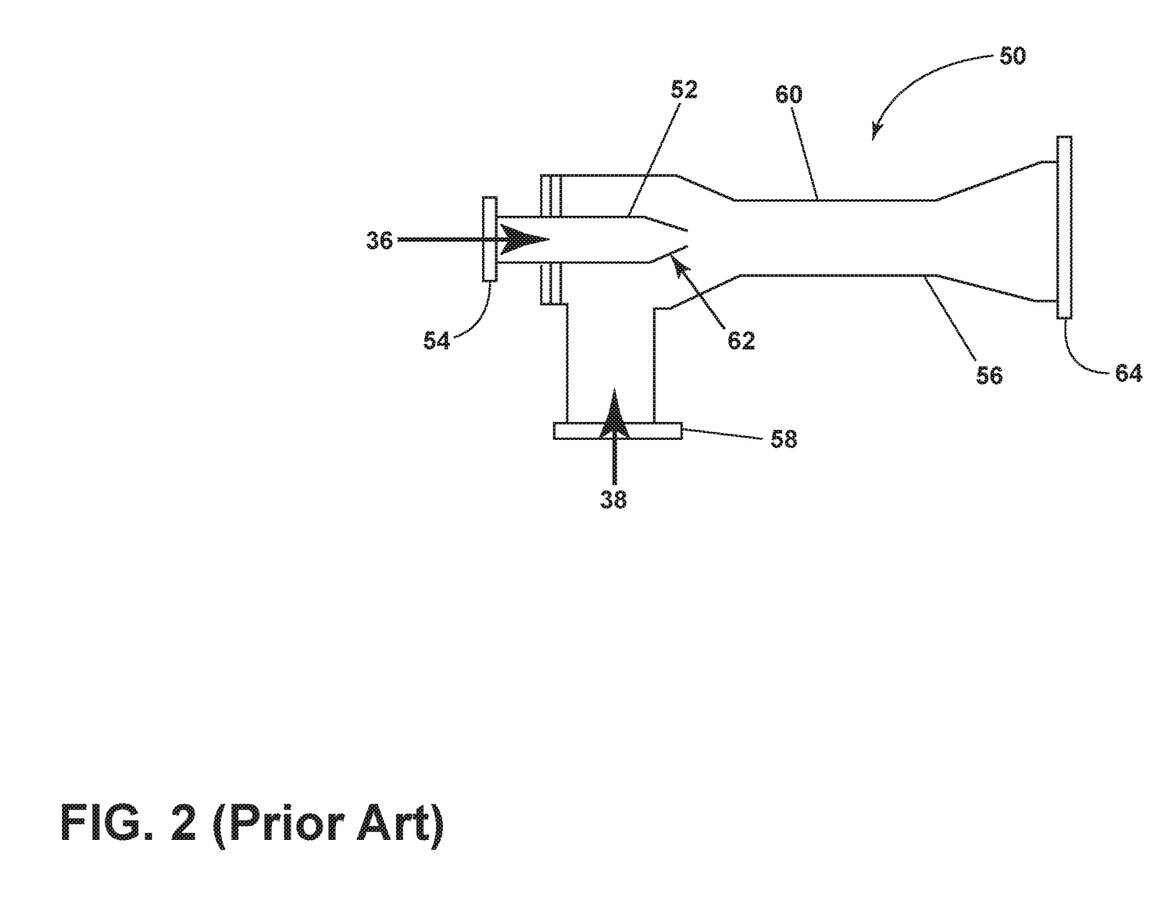
FIG. 2 is a cross-sectional schematic illustration of a typical prior art, fixed geometry ejector.

FIG. 2 is a cross-sectional schematic illustration of a typical prior art, fixed geometry ejector 50. The ejector 50 of the prior art includes a primary nozzle 52 in fluid communication with a primary fluid inlet 54, and a secondary nozzle 56 in fluid communication with a secondary fluid inlet 58 and a secondary nozzle outlet 64. The primary nozzle 52 is oriented generally concentrically within the secondary nozzle 56 and the secondary nozzle 56 has a venturi 60 downstream of an outlet 62 of the primary nozzle 52. As shown in FIG. 2, the primary nozzle 52 has a fixed exit area A and a fixed geometry, regardless of the operating conditions experienced by the ejector 50 in operation.

Figure 3:
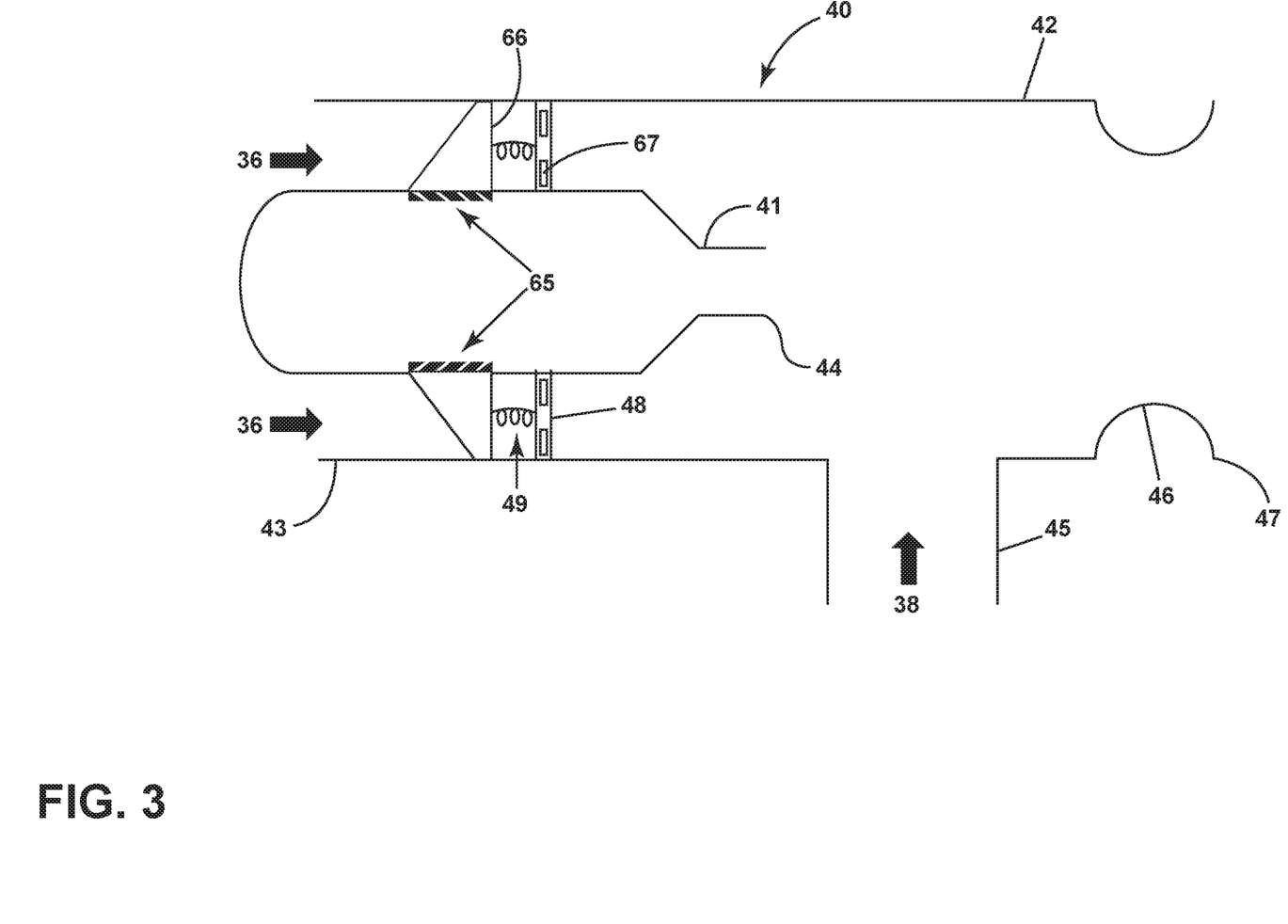
FIG. 3 is a cross-sectional schematic illustration of an exemplary embodiment of an ejector with a pressure balanced axial ring with angled slots to vary primary nozzle area.

FIG. 3 is a cross-sectional schematic illustration of an exemplary embodiment of an ejector 40. The exemplary ejector 40 includes a primary nozzle 41 in fluid communication with a primary fluid inlet 43, and a secondary nozzle 42 in fluid communication with a secondary fluid inlet 45 and a secondary nozzle outlet 47. The primary nozzle 41 is oriented generally concentrically within the secondary nozzle 42 and the secondary nozzle 42 has a venturi 46 downstream of an outlet 44 of the primary nozzle 41. Primary air flow 36 for the primary nozzle 41 may be from a high pressure source 32. Low pressure air, or suction flow 38, may be from a low pressure region 34. The effective area A of the primary nozzle 41 may be varied with a pressure balanced circumferential ring 66 which is axially translatable to progressively expose angled slots 65 to vary primary nozzle area A. Ring 66 may be a single, 360 degree piece or may be assembled from a plurality of segments. Ring 66 acts upon springs 49, which are backed by a backing plate 48 with pressure balance holes 67, to close angled slots 65 when the pressure of the primary flow is low and expose more angled slots 65 when the primary pressure is high. The primary flow 36 acts upon the sliding ring 66, in opposition to the springs 49, to progressively expose increasing numbers of angled slots 65 in response to increased pressure from the primary flow 36. In some embodiments, the leakage flow through the backing plate may be accelerated through a converging flow path approaching the primary nozzle to maximize the ejector effect. In this embodiment, the sliding ring 66 concentrically surrounds the primary nozzle 41. FIG. 3 may represent a low power condition for a gas turbine engine 10 where the ring is not exposed to a higher pressure and decreased flow through both the primary and secondary nozzles 41, 42 is desired. In a high power condition for a gas turbine engine 10, where the ring 66 is exposed to a higher pressure, the ring 66 may expose more angled slots 65 when increased flow through both the primary and secondary nozzles 41, 42 is desired.

Figure 4:
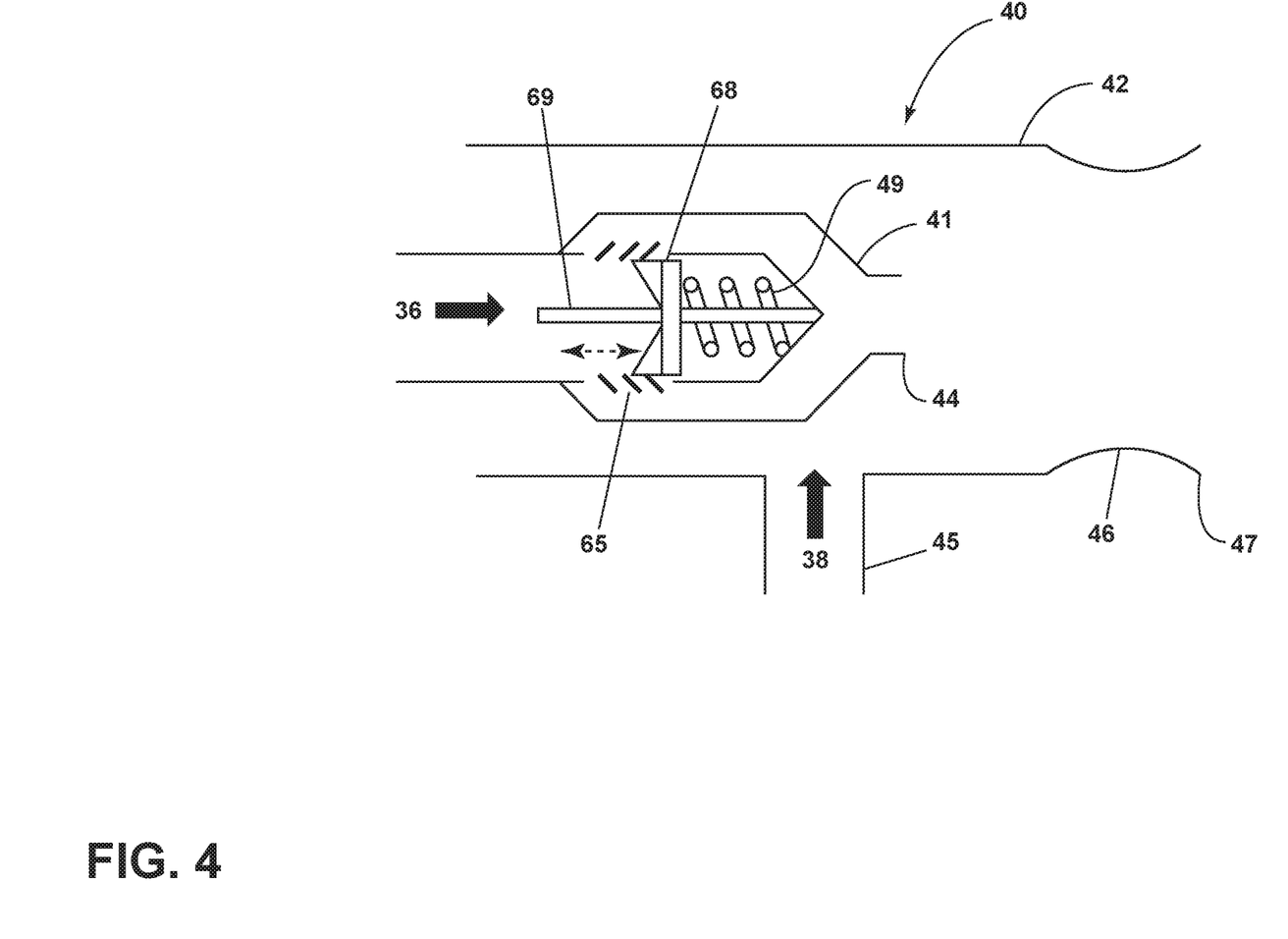
FIG. 4 is a cross-sectional schematic illustration of an exemplary embodiment of an ejector with a pressure balanced piston with angled slots to vary primary nozzle area.

FIG. 4 is a cross-sectional schematic illustration of an exemplary embodiment of an ejector 40, which is similar to the ejector 40 of FIG. 3, and like elements bear the same reference numerals as in FIG. 3. In the embodiment of FIG. 4, the translatable ring 66 is replaced with a pressure balanced piston 68 which slides along a piston rod 69 and exposes angled slots 65 to vary primary nozzle 41 effective area A. The primary flow 36 acts upon the piston 68, which is concentrically internal to the primary nozzle 41, to overcome the force of the spring 49 and progressively expose increasing numbers of angled slots 65 in response to increased pressure from the primary flow 36. Increased pressure may correlate to a high power condition for a gas turbine engine 10 when increased flow through both the primary and secondary nozzles 41, 42 is desired as shown in FIG. 4, while a decreased pressure may cause the piston 68 to obstruct more angled slots 65 when decreased flow through both the primary and secondary nozzles 41, 42 is desired.

Figure 5:
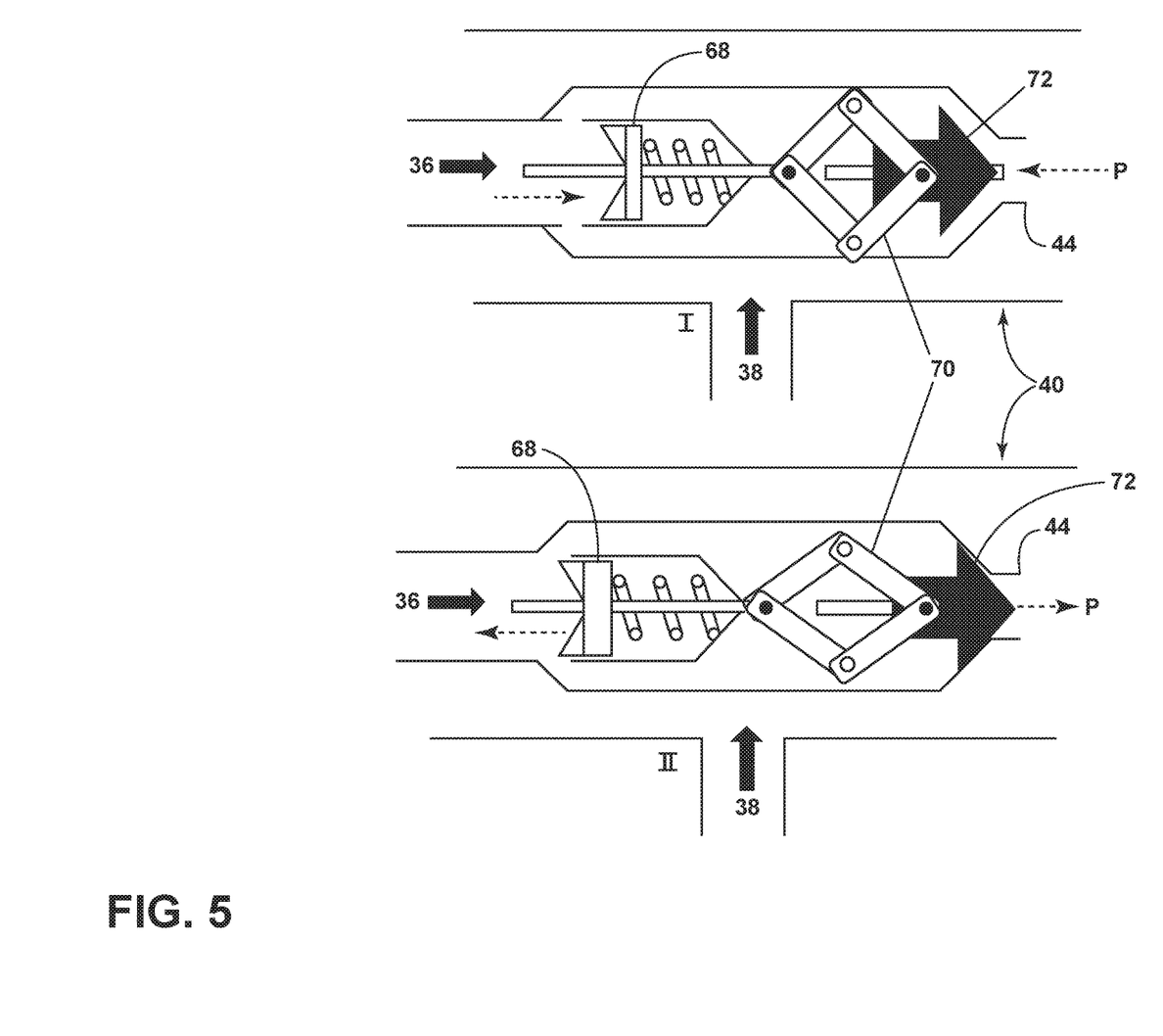
FIG. 5 is a cross-sectional schematic illustration of an exemplary embodiment of an ejector with a piston connected by a linkage to a primary nozzle plug depicting two different operating conditions with two different primary nozzle areas.

FIG. 5 is a cross-sectional schematic illustration of an exemplary embodiment of an ejector 40 with a piston 68, similar to the piston 68 of FIG. 4, but connected by a linkage 70 to a primary nozzle plug 72. The linkage is exemplary only and not intended to be limiting, as any suitable linkage mechanism that allows the nozzle plug to translate along the primary flow direction may be utilized. FIG. 5 depicts two different operating conditions, I and II, with two different primary nozzle areas A. In the top illustration, condition I, the primary flow 36 exerts a pressure upon the piston 68 which is opposed by downstream pressure P and thus the primary nozzle area remains open. In the lower illustration, condition II, the primary flow 36 exerts a pressure upon the piston 68 which is sufficient to overcome downstream pressure P and thus the primary nozzle area A is reduced by the primary nozzle plug 72 engaging with the primary nozzle outlet 44.

Figure 6:
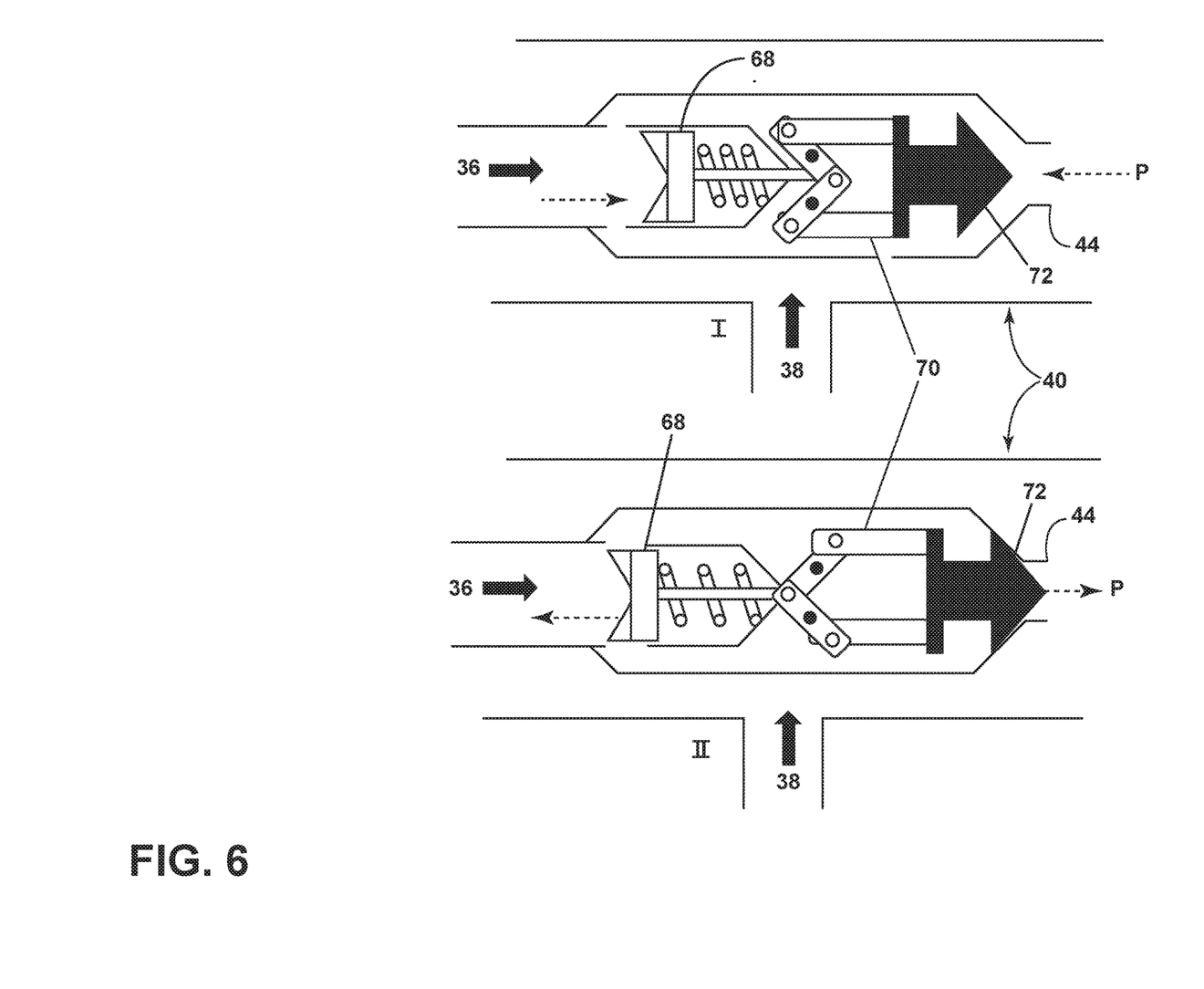
FIG. 6 is a cross-sectional schematic illustration of an exemplary embodiment of an ejector similar to that of FIG. 4, utilizing a different linkage configuration, plug depicting two different operating conditions with two different primary nozzle areas.

FIG. 6 is a cross-sectional schematic illustration of an exemplary embodiment of an ejector 40 similar to that of FIG. 5, but utilizing a different linkage 70 configuration, depicting two different operating conditions I and II with two different primary nozzle areas A.

Figure 7:
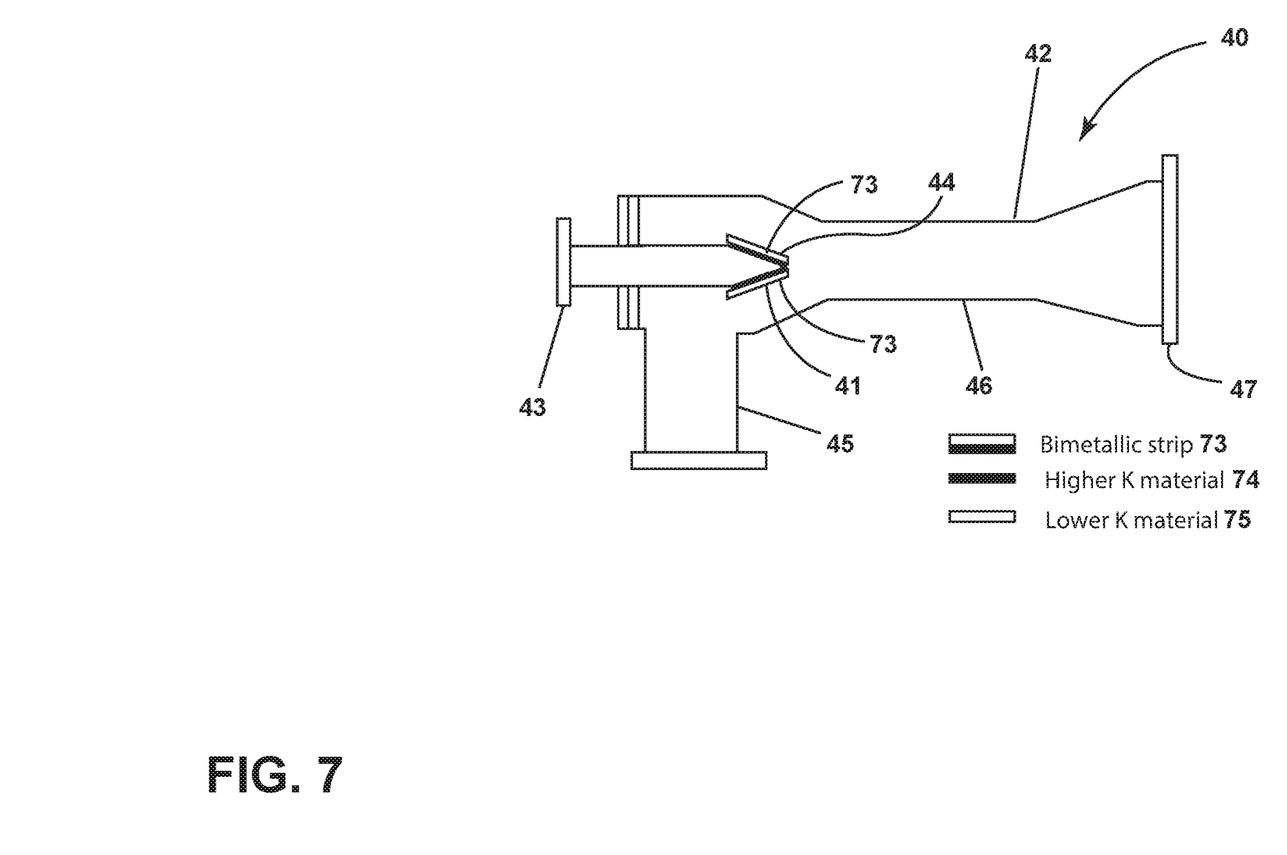
FIG. 7 is a cross-sectional schematic illustration of an exemplary embodiment of an ejector utilizing bimetallic strips at the primary nozzle exit to control the primary nozzle area.

FIG. 7 is a cross-sectional schematic illustration of an exemplary embodiment of an ejector 40 utilizing bimetallic strips 73 at the primary nozzle exit 44 to control the primary nozzle area A. Bimetallic strips 73 consist of conjoined strips of material with different rates of thermal growth, such that the bimetallic strip 73 deforms out of plane due to the different coefficient of thermal expansion K of each strip, thereby modulating the area of the primary nozzle 44 as a function of temperature. Other differential properties in the strips of material in the bimetallic strip are contemplated as well, such as modulus of elasticity. Each bimetallic strip 73 includes a higher K material 74 and a lower K material 75. In the embodiment shown, the higher K material 74 is located on the inward surface, such that exposure to higher temperature causes the higher K material 74 to expand at a higher rate than the lower K material 75 and thus cause the bimetallic strip 73 to deflect outward away from the center of the primary nozzle exit 44. Bimetallic strips may be of any suitable shape, material, and construction to provide the desired modulation of the primary nozzle area. They may be located on one side of a primary nozzle 41, on two sides, or on 4 or more sides and may be arranged circumferentially around the periphery of the primary nozzle exit 44. Multiple bimetallic strips 73 may also be of equal or unequal size and shape.

Figure 8:
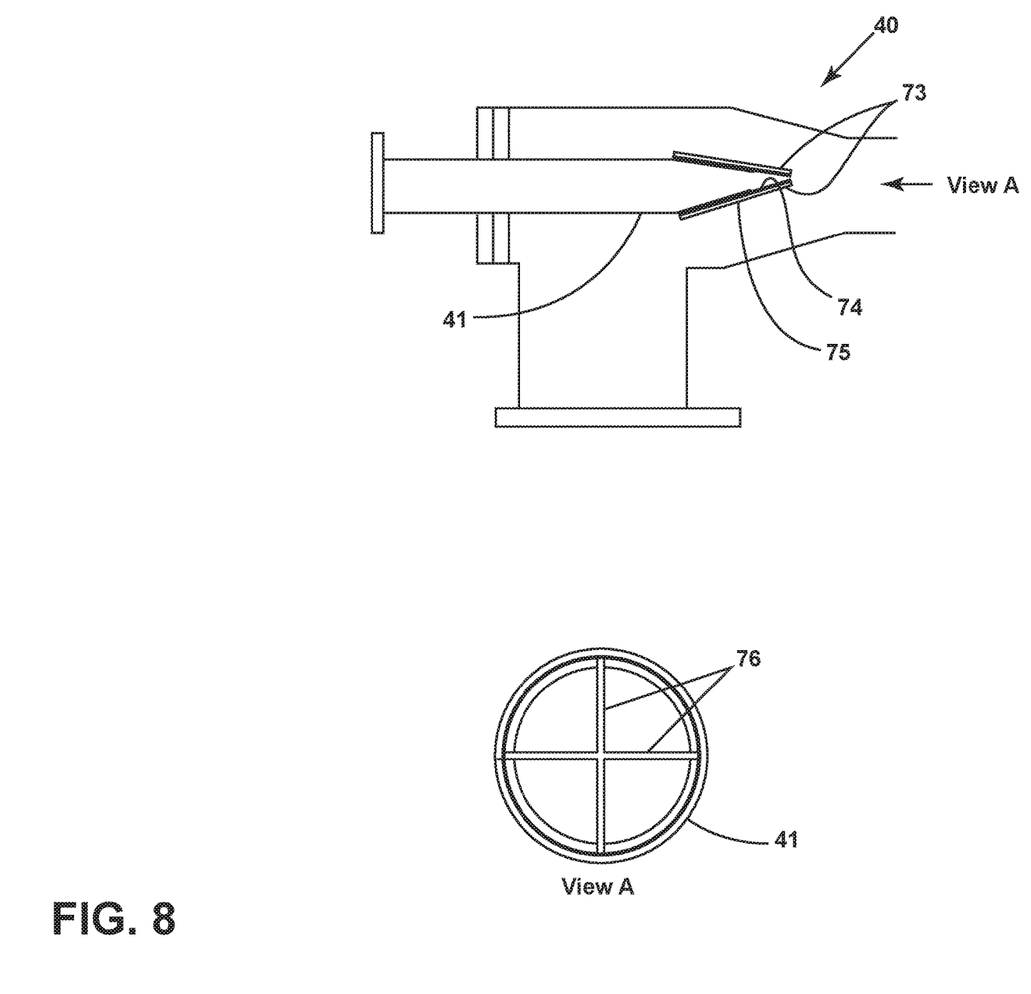
FIGS. 8 and 9 are cross-sectional schematic illustrations of the ejector of FIG. 6, depicting two different operating conditions with two different primary nozzle areas.
Figure 9:
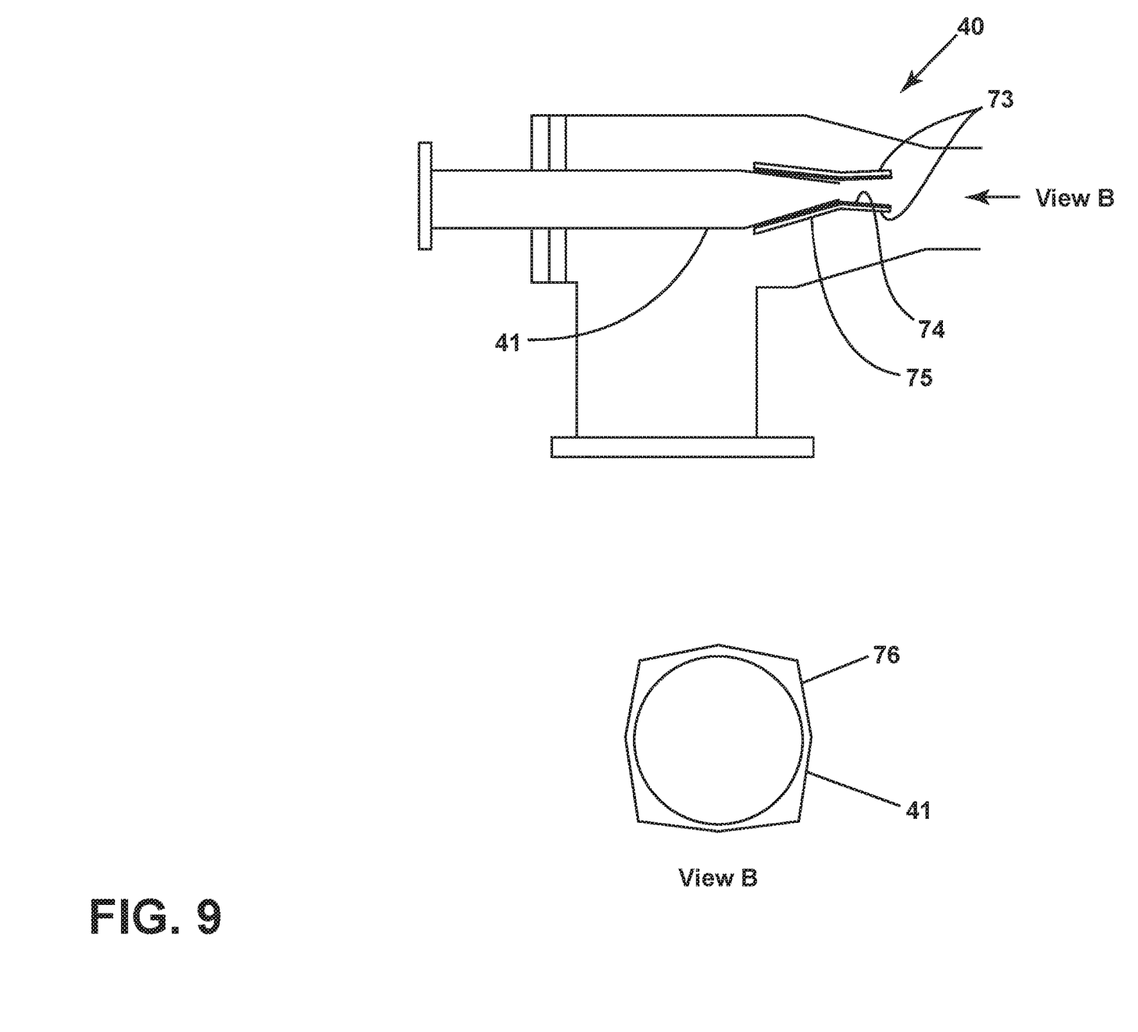

FIGS. 8 and 9 are cross-sectional schematic illustrations of the exemplary ejector 40 of FIG. 6, depicting two different operating conditions with two different primary nozzle areas A. Note that the ejector nozzle does not need to be axisymmetric, but could be implemented as a 2-dimensional configuration with flaps that open and close along a centerline. In the illustration of FIG. 8, the bimetallic strips 73 serve to substantially close the exit 44 of the primary nozzle 41. Like petals on a flower, the bimetallic strips 73 extend radially inwardly and their edges 76 meet to close the primary nozzle exit 44 as shown in View A. In the illustration of FIG. 9, the bimetallic strips 73 have moved radially outwardly and their edges 76 no longer obstruct the primary nozzle exit 44. FIG. 9 may represent a high power condition for a gas turbine engine 10 where the bimetallic strips 73 are exposed to a higher temperature and increased flow through both the primary and secondary nozzles 41, 42 is desired. FIG. 8 may represent a low power condition for a gas turbine engine 10 where the bimetallic strips 73 are not exposed to a higher temperature and decreased flow through both the primary and secondary nozzles 41, 42 is desired.

Figure 10:
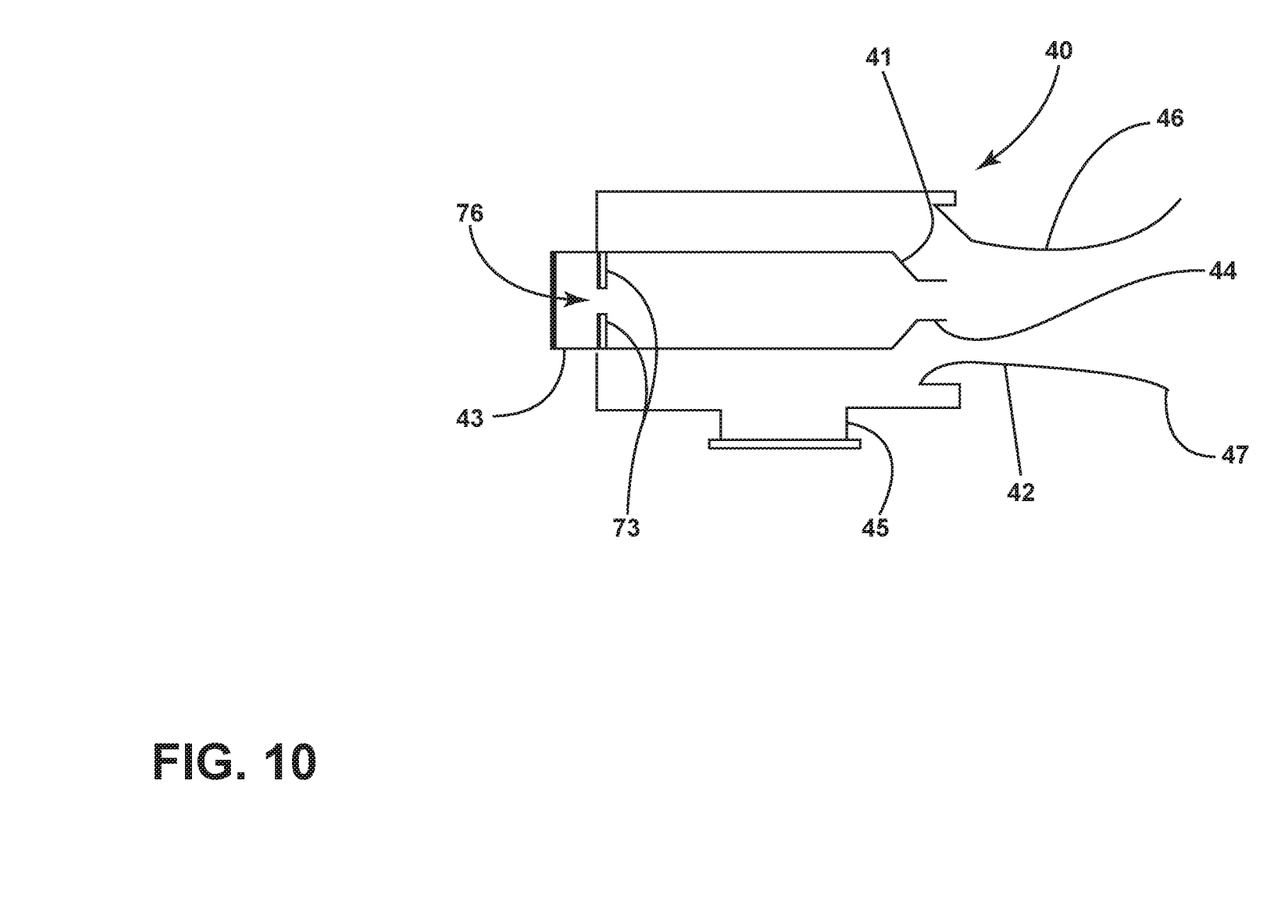
FIG. 10 is a cross-sectional schematic illustration of an exemplary embodiment of an ejector utilizing bimetallic strips within the primary nozzle to control the primary nozzle area.

FIG. 10 is a cross-sectional schematic illustration of an exemplary embodiment of an ejector 40 utilizing bimetallic strips 73 within the interior of the primary nozzle 41 to control an internal primary nozzle area 76. Operationally similar to the embodiment of FIGS. 7-9, the bimetallic strips 73 are contained within the primary nozzle 41 but similarly serve to regulate the effective exit area 76 of the primary nozzle 41 and thus modulate the primary flow to respond to various operating conditions, such as may be experienced in a gas turbine engine 10.

Ejectors as described herein may be found in many different technology areas, and used in many different systems, including gas turbine engine systems where they may be utilized to pressurize or vent sump systems and manage bleed air flows. Ejectors as described herein passively modulate flow based on primary flow static pressure and/or primary flow temperature.

Elements of the ejectors described herein may be made from any suitable materials for the operating environment and operating conditions encountered, including temperatures, pressures, vibrations, etc. Metallic materials, composite materials, and ceramic materials are among the material choices which may be suitable for particular applications, and the elements of the ejectors may be manufactured by any suitable manufacturing methods including casting, molding, welding, brazing, and/or additive manufacturing.

All publications, patents and patent applications cited herein, whether supra or infra, are hereby incorporated by reference in their entirety to the same extent as if each individual publication, patent or patent application was specifically and individually indicated as incorporated by reference. It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

It must be noted that, as used in this specification and the appended claims, the singular forms "a," "an" and "the" include plural referents unless the content clearly dictates otherwise.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, materials and methods according to some embodiments are described herein.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Various characteristics, aspects, and advantages of the present disclosure may also be embodied in any permutation of aspects of the disclosure, including but not limited to the following technical solutions as defined in the enumerated aspects:

1. An ejector assembly includes a primary nozzle in fluid communication with a primary fluid inlet, a secondary nozzle in fluid communication with a secondary fluid inlet, the primary nozzle being oriented concentrically within the secondary nozzle and the secondary nozzle having a venturi downstream of the primary nozzle, and the primary nozzle having a variable cross-sectional area.

2. The ejector assembly of Aspect 1, wherein the primary nozzle includes at least one translatable ring, such that the primary nozzle area is variable as a function of pressure.

3. The ejector assembly of Aspect 2, wherein the primary nozzle area increases with increased pressure of a primary fluid from the primary fluid inlet.

4. The ejector assembly of Aspect 1, wherein the primary nozzle includes a translatable piston, such that the primary nozzle area is variable as a function of pressure.

5. The ejector assembly of Aspect 4, wherein the primary nozzle area increases with increased pressure of a primary fluid from the primary fluid inlet.

6. The ejector assembly of Aspects 4 or 5, wherein the translatable piston moves a primary nozzle plug.

7. The ejector assembly of Aspect 1, wherein the primary nozzle includes at least one bimetallic strip, such that the primary nozzle area is variable as a function of temperature.

8. The ejector assembly of Aspect 7, wherein the primary nozzle area increases with increased temperature of a primary fluid from the primary fluid inlet.

9. The ejector assembly of Aspects 7-8, wherein the bimetallic strips are located at an exit of the primary nozzle.

10. The ejector assembly of Aspects 7-8, wherein the bimetallic strips are located within an interior of the primary nozzle.

11. A gas turbine engine includes a source of high pressure air, a region of low pressure air, and an ejector assembly, the ejector assembly includes a primary nozzle in fluid communication with a primary fluid inlet, the primary fluid inlet in fluid communication with the source of high pressure air, a secondary nozzle in fluid communication with a secondary fluid inlet, the secondary fluid inlet in fluid communication with the region of low pressure air, the primary nozzle being oriented concentrically within the secondary nozzle and the secondary nozzle having a venturi downstream of the primary nozzle, and the primary nozzle having a variable cross-sectional area.

12. The gas turbine engine of Aspect 11, wherein the primary nozzle includes at least one translatable ring, such that the primary nozzle area is variable as a function of pressure.

13. The gas turbine engine of Aspect 12, wherein the primary nozzle area increases with increased pressure of high pressure air from the primary fluid inlet.

14. The gas turbine engine of Aspect 11, wherein the primary nozzle includes a translatable piston, such that the primary nozzle area is variable as a function of pressure.

15. The gas turbine engine of Aspect 14, wherein the primary nozzle area increases with increased pressure of high pressure air from the primary fluid inlet.

16. The gas turbine engine of Aspect 11, wherein the primary nozzle includes at least one bimetallic strip, such that the primary nozzle area is variable as a function of temperature.

17. The gas turbine engine of Aspects 11-16, wherein the primary nozzle area increases with increased temperature of high pressure air from the primary fluid inlet.

18. The gas turbine engine of Aspects 11-17, wherein the source of high pressure air is a bleed from a stage of a high pressure compressor.

19. The gas turbine engine of Aspects 11-18, wherein the region of low pressure air is a sump.

20. The gas turbine engine of Aspects 11-19, wherein the primary nozzle area increases when the gas turbine engine is operating in a high power condition.

While this disclosure has been described as having exemplary embodiments, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. An ejector assembly, comprising:
   a primary nozzle in fluid communication with a primary fluid inlet, the primary nozzle comprising an outlet;
   a secondary nozzle in fluid communication with a secondary fluid inlet, the secondary nozzle comprising a venturi downstream from the outlet of the primary nozzle; and
   at least one translatable ring that surrounds an outside surface of the primary nozzle, wherein the at least one translatable ring is configured to allow a primary air flow from the primary fluid inlet to enter the primary nozzle from a location that is radially outward from the primary nozzle;
   wherein the primary nozzle is oriented concentrically within the secondary nozzle and the primary nozzle has a variable nozzle cross-sectional area.

2. The ejector assembly of claim 1, wherein the variable nozzle cross-sectional area of the primary nozzle is variable as a function of pressure.

3. The ejector assembly of claim 2, wherein the variable nozzle cross-sectional area of the primary nozzle increases with increased pressure of the primary air flow from the primary fluid inlet.

4. The ejector assembly of claim 1, wherein the primary nozzle comprises a plurality of slots, wherein the at least one translatable ring is axially translatable to progressively expose the plurality of slots, wherein the primary air flow enters the primary nozzle through at least one of the plurality of slots.

5. The ejector assembly of claim 1, wherein the at least one translatable ring is assembled from a plurality of segments.

6. The ejector assembly of claim 1, wherein the primary fluid inlet is in fluid communication with a high pressure source and the secondary fluid inlet is in fluid communication with a low pressure source.

7. The ejector assembly of claim 1, wherein the at least one translatable ring that surrounds the outside surface of the primary nozzle is translatable in relation to both the primary nozzle and the secondary nozzle.

8. A gas turbine engine comprising:
   a source of high pressure air;
   a region of low pressure air; and
   an ejector assembly, the ejector assembly comprising:
      a primary nozzle in fluid communication with a primary fluid inlet, the primary fluid inlet in fluid communication with the source of high pressure air, the primary nozzle comprising an outlet;
      a secondary nozzle in fluid communication with a secondary fluid inlet, the secondary fluid inlet in fluid communication with the region of low pressure air, the secondary nozzle comprising a venturi downstream from the outlet of the primary nozzle; and
      at least one translatable ring that surrounds an outside surface of the primary nozzle, wherein the at least one translatable ring is configured to allow a primary air flow from the primary fluid inlet to enter the primary nozzle from a location that is radially outward from the primary nozzle;
   wherein the primary nozzle is oriented concentrically within the secondary nozzle and the primary nozzle has a variable nozzle cross-sectional area.

9. The gas turbine engine of claim 8, wherein the variable nozzle cross-sectional area of the primary nozzle is variable as a function of pressure.

10. The gas turbine engine of claim 9, wherein the variable nozzle cross-sectional area of the primary nozzle increases with increased pressure of the primary air flow from the primary fluid inlet.

11. The gas turbine engine of claim 8, wherein the source of high pressure air is a bleed from a stage of a high pressure compressor.

12. The gas turbine engine of claim 8, wherein the region of low pressure air is a sump.

13. The gas turbine engine of claim 8, wherein the variable nozzle cross-sectional area of the primary nozzle increases when the gas turbine engine is operating in a high power condition.

14. The gas turbine engine of claim 8, wherein the primary nozzle comprises a plurality of slots, wherein the at least one translatable ring is axially translatable to progressively expose the plurality of slots, wherein the primary air flow enters the primary nozzle through at least one of the plurality of slots.

15. The gas turbine engine of claim 14, wherein the at least one translatable ring is configured to expose more slots of the plurality of slots when the gas turbine engine is operating in a high power condition and less slots of the plurality of slots when the gas turbine engine is operating in a low power condition.

16. The gas turbine engine of claim 15, wherein the ejector assembly comprises a backing plate and a plurality of springs, wherein the at least one translatable ring is configured to act upon the plurality of springs, which are backed by the backing plate.

\* \* \* \* \*